Oct. 30, 1962     TAKEO NOJIMA     3,061,388
ROTATING SHAFT BEARING SYSTEMS
Filed Jan. 4, 1961     2 Sheets-Sheet 1

INVENTOR:
TAKEO NOJIMA
BY
Richardson, David and Nardon
Attys.

Oct. 30, 1962

TAKEO NOJIMA 3,061,388

ROTATING SHAFT BEARING SYSTEMS

Filed Jan. 4, 1961

INVENTOR:
TAKEO NOJIMA
BY
Richardson, David and Nardon
ATTYS.

3,061,388
ROTATING SHAFT BEARING SYSTEMS
Takeo Nojima, 542 Kosugi-cho, 1-chome,
Kawasaki City, Japan
Filed Jan. 4, 1961, Ser. No. 80,675
Claims priority, application Japan Feb. 18, 1960
2 Claims. (Cl. 308—203)

This invention relates to rotating shaft bearing systems, and more particularly to systems for supporting and bearing horizontal rotating shafts of substantially heavy weight.

An object of the present invention is to provide a new system for supporting and bearing a horizontal rotating shaft having an especially heavy weight.

Another object of the present invention is to provide the rotating shaft bearing system of the type specified wherein the heavy horizontal rotating shaft can be supported in the proper position irrespective of variations of its external diameter within certain limits.

A further object of the present invention is to provide a bearing device for supporting an especially heavy horizontal rotating shaft with a minimum frictional resistance against the rotation of the shaft.

Other objects and particularities of the present invention will be made obvious by the following detailed description with reference to the accompanying drawings, in which.

Figure 1:
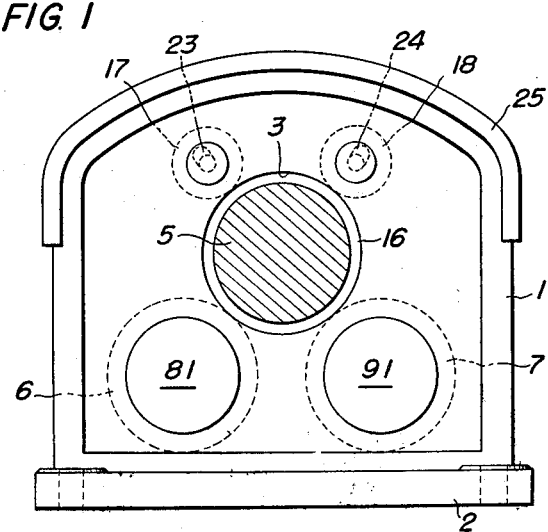
FIG. 1 is an end elevational view of a bearing device embodying the present invention, with an end cover removed.
Figure 2:
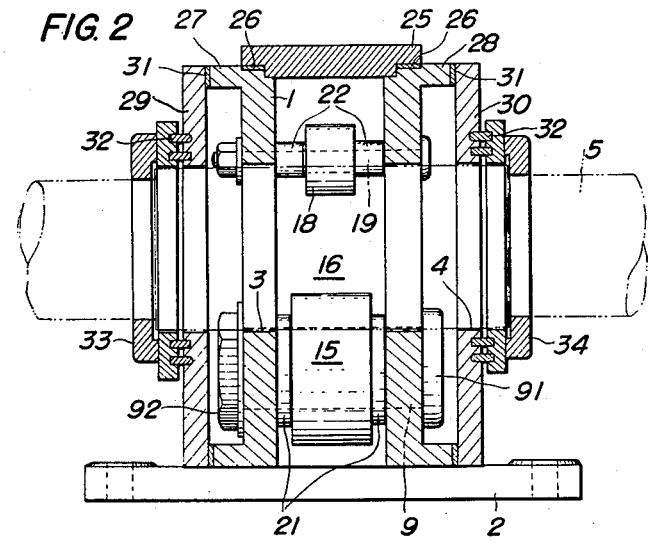
FIG. 2 is a longitudinal sectional view of the bearing device shown in FIG. 3.
Figure 3:
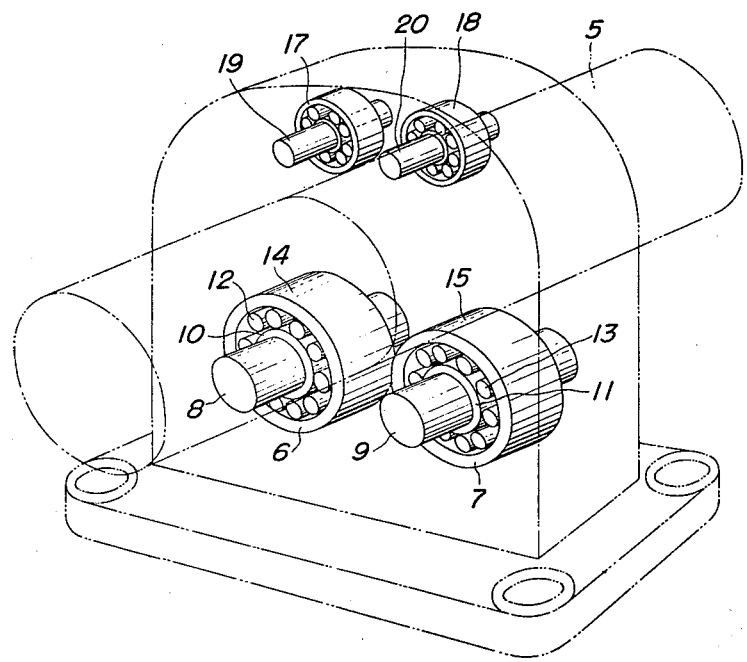
FIG. 3 shows a general arrangement of various roller bearing units shown in FIGS. 1 and 2.

Referring to the drawings, a housing 1 is mounted on a bed plate 2. The housing 1 has two opposite parallel vertical walls spaced apart from each other a suitable distance. These two vertical walls have circular openings 3 and 4 which register with each other in alignment.

A horizontal rotating shaft 5 passes through the openings 3 and 4 with a suitable clearance gap between the shaft surface and the cylindrical wall surfaces of openings 3 and 4. A pair of roller bearing units 6 and 7 are disposed within the housing 1 below the shaft 5 at the opposite sides of a vertical plane passing through the longitudinal axial line of shaft 5.

The bearing units 6 and 7 are supported on horizontal bolts 8 and 9, respectively, parallel to the shaft 5, and each comprises an inner race 10 or 11, a series of rollers 12 or 13, and an outer race 14 or 15. The bolts 8 and 9 pass through appropriate openings in the opposite vertical walls of the housing 1 and are supported thereby. Each bolt 8, 9, has an enlarged head 81, 91, engaging the outer face of one vertical wall of housing 1. Each bolt is provided with a nut 92 which engages a corresponding threaded portion of the bolt and cooperates with the outer face of the other vertical wall of housing 1 to rigidly secure the bolt to the housing.

The inner races 10 and 11 surround the bolts 8 and 9, respectively, and are fixed thereto, while the outer races 14 and 15 of bearing units 6 and 7 are freely revolvable around respective series of bearing rollers 12 and 13. Series of bearing rollers 12 and 13 may alternatively be series of bearing balls arranged in multiple rows.

The outer peripheral surfaces of outer races 14 and 15 are machined into correct cylindrical shapes, and frictionally engage the cylindrical surface of shaft 5. The shaft 5 may be covered by a cylindrical sleeve 16 for reinforcement at the portion which engages the bearing races 14 and 15. The sleeve 16 may conveniently be extended to reach the end cover devices described later.

Thus, the weight of shaft 5 is supported by the bearing units 6 and 7 and borne thereby. The cylindrical surface of shaft 5 or sleeve 16, if provided, and bearing races 14 and 15 frictionally engage each other, and there is no slippage occurring therebetween during rotation. Consequently, frictional resistance against the rotational movement is only that existing within the roller bearing units 6 and 7.

In order to prevent any transversal displacement of the shaft 5, another pair of roller or ball bearing units of smaller size 17 and 18 are disposed above the shaft 5 at opposite sides of the vertical plane passing through the longitudinal axial line of shaft 5. These bearing units 17 and 18 are of quite similar construction with bearing units 6 and 7, and their cylindrical outer races frictionally engage the cylindrical surface of shaft 5 or sleeve 16, if provided.

The inner races of bearing units 17 and 18 are rigidly mounted on horizontal bolts 19 and 20, respectively, similar to but smaller in diameter than bolts 8 and 9. The bolts 19 and 20 are rigidly supported in the housing 1 substantially as are the bolts 8 and 9. Suitable spacer rings 21 and 22 function to position longitudinally the bearing units 6, 7 and 17, 18, respectively. However, the bolts 19 and 20 pass through obliquely elongated openings 23 and 24 in the vertical walls of housing 1 and are supported thereby. The bolts 19 and 20 can, therefore, be adjustable in radial directions with respect to the shaft 5, so that the bearing units 17 and 18 may be adjusted radially to correspond to the correct outer diameter of the shaft 5 irrespective of its variation within certain limits.

It should be noted that bearing units 17 and 18 do not support the weight of shaft 5, but merely restrain the shaft against any transversal displacement, and may, consequently, be of light construction in comparison to bearing units 6 and 7.

The housing 1 has a top opening closed by a removable cover plate 25 with packing means 26. The opposite vertical walls of housing 1 are provided with peripheral outer flanges 27 and 28 to which are secured end cover assemblies 29 and 30, respectively, with packing means 31.

Each end cover assembly 29 or 30 comprises a pair of vertical plates connected with each other by annular sealing rings 32, and having registering circular openings to slidably receive the sleeve 16 of shaft 5. The chamber formed within the housing 1 as well as the spaces defined by the vertical walls having flanges 27, 28 and the end cover assemblies 29, 30, may be filled with a suitable lubricating medium, not shown, and all the rotating parts can be adequately lubricated. The outer sides of both end cover devices 29 and 30 are protected by dustproof covers 33 and 34, respectively.

According to the present invention, an especially heavy horizontal rotating shaft can be supported and borne in a proper manner with least frictional resistance and maximum useful life.

I claim:
1. A system for bearing a heavy horizontal cylindrical rotating shaft, comprising: a cylindrical reinforcing sleeve on a portion of said shaft, said sleeve having an outer friction bearing surface, a first pair of bearing units disposed at opposite sides of a vertical plane passing through the longitudinal axis of said shaft at a level lower than said axis, a second pair of bearing units disposed at opposite sides of said vertical plane at a level higher than said axis, each of said bearing units comprising a stationary support, a stationary inner cylindrical race carried by said support, a revolvable outer cylindrical race concentric with the inner race frictionally contacting the bearing surface of the sleeve, anti-friction bearing rollers dis- posed between the inner and outer races, a housing enclosing said sleeve and bearing units, said housing comprising a pair of opposed vertical walls, each of said vertical walls having a peripheral outer flange, cover assemblies respectively secured to the outer flanges of the vertical walls, each of the cover assemblies including a pair of spaced vertical plates having aligned circular openings, annular sealing rings connecting together the pair of plates in each cover assembly, and a quantity of lubricant filling said housing between said cover assemblies to lubricate said bearing units, the supports of said bearing units being carried by said opposed vertical walls, said shaft being axially slidable out of said housing through said aligned openings without disassembling the housing.

2. A system according to claim 1, wherein the bearing units in the first pair thereof have larger diameters than the bearing units in the second pair, the supports of said bearing units being bolts extending through holes in said vertical walls, the holes receiving the bolts of the second pair of bearing units being radially elongated for yieldably supporting said second pair of bearing units in contact with said sleeve.

References Cited in the file of this patent

UNITED STATES PATENTS

| | | |
|---|---|---|
| 2,794,692 | Nemeth | June 4, 1957 |
| 2,947,580 | Fisher | Aug. 2, 1960 |